May 22, 1934. D. PRYDE 1,959,925
METHOD OF MAKING BIMETALLIC ARTICLES
Filed Dec. 26, 1931 2 Sheets-Sheet 1
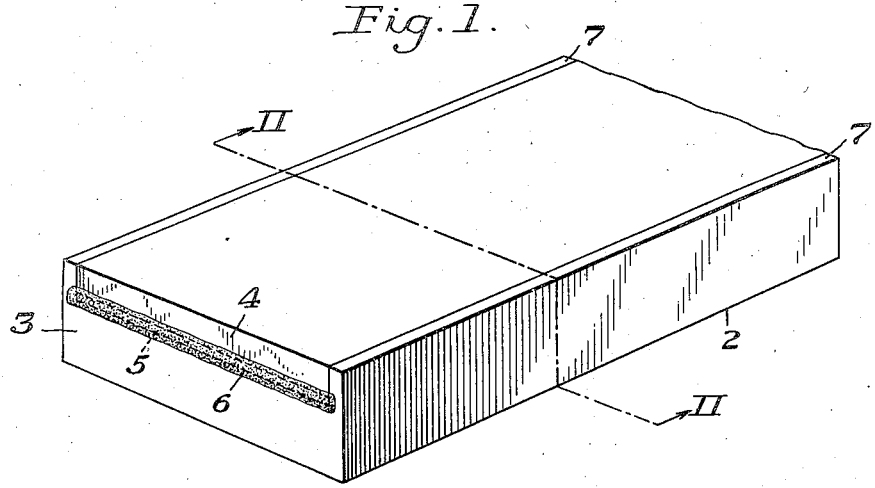
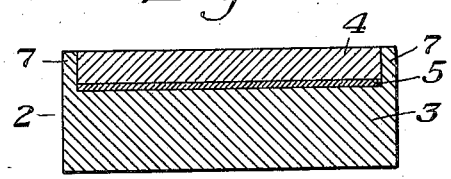
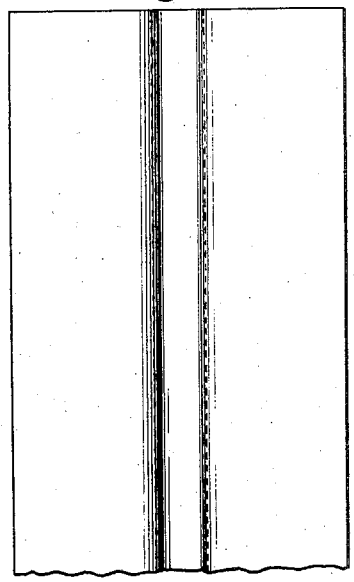
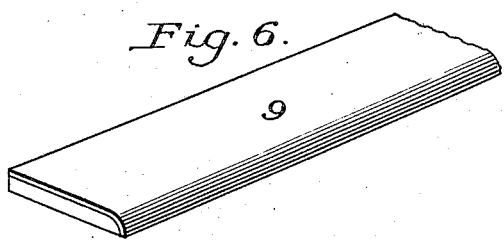
INVENTOR
David Pryde
by Byrnes, Stebbins, Parmelee & Blenko
his attorneys May 22, 1934.　　　　　D. PRYDE　　　　　1,959,925
METHOD OF MAKING BIMETALLIC ARTICLES
Filed Dec. 26, 1931　　　2 Sheets-Sheet 2
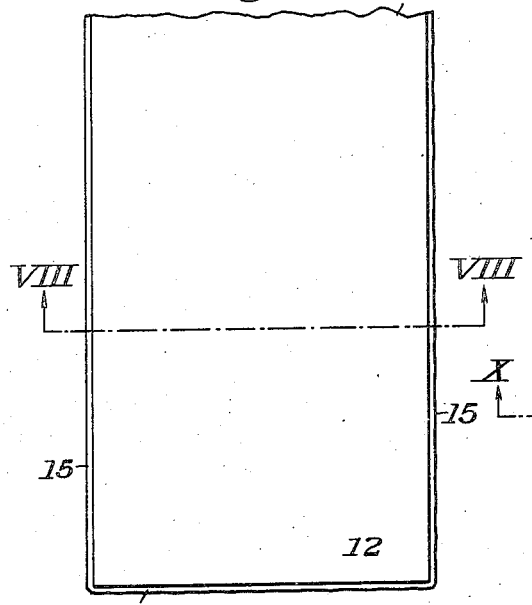
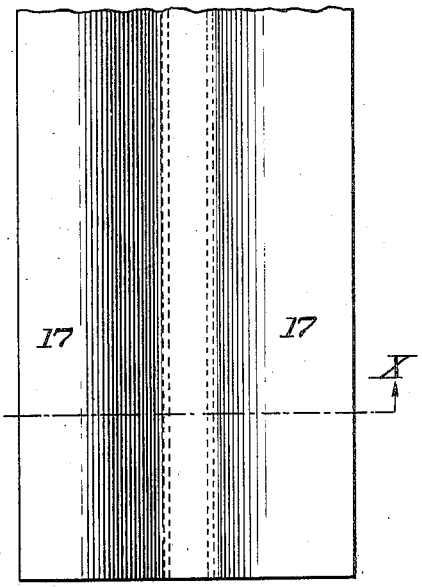
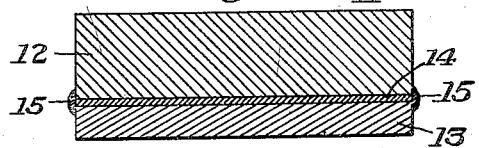
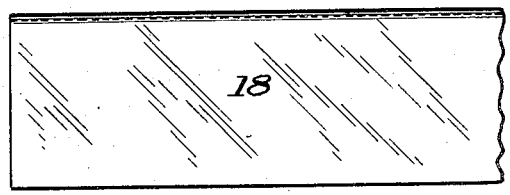
INVENTOR
David Pryde
his attorney Patented May 22, 1934

1,959,925

UNITED STATES PATENT OFFICE 1,959,925

METHOD OF MAKING BIMETALLIC ARTICLES

David Pryde, Aspinwall, Pa., assignor to Superior Steel Corporation, Pittsburgh, Pa., a corporation of Virginia Application December 26, 1931, Serial No. 583,214

5 Claims. (Cl. 29—148)

This invention relates to the art of making bimetallic articles, and more particularly bimetallic articles having one metal disposed on more than one side of the other. The invention relates still more particularly to the production of elongated bimetallic articles such as strips, bars and rods having a metal backing provided with a facing of a dissimilar metal on more than one side.

Bimetallic articles comprising a backing faced, for example, on two adjacent sides with a dissimilar metal may be used to advantage in numerous ways, such, for example, as for making automobile bumpers. The base metal used for automobile bumpers must be strong enough and the bumper stock must be of sufficient weight to withstand the rough usage to which bumpers are subjected. Ordinarily the base metal of bumper stock is high carbon steel which is suitable from the structural standpoint. On account of the fact that such high carbon steel, which is not rust-proof, would become unsightly upon being exposed to the elements for a period of time, it may be faced with a rust resistant metal, such, for example, as the metals commonly known as rustless iron and stainless steel.

The visible portions of a bumper are the top and front thereof, and it is therefore desirable to utilize bumper stock having the usual high carbon steel backing faced at its front and top with a rust resistant material. Such bimetallic material is also useful in numerous other respects, and it may in some cases be desirable to provide a bimetallic article comprising a backing faced, for example, on three sides by a dissimilar metal.

The bimetallic article is preferably made by forming a bimetallic member of irregular cross-section and severing the same in such manner as to form an article having one metal disposed on more than one side of the other. Preferably backing and facing metals are joined together and rolled to weld together, thin, elongate and deform the same so that upon severing the rolled product intermediate its edges one or more elongated bimetallic strips comprising a backing faced on more than one side with the facing metal are produced.

Other objects and advantages of the invention will become apparent as the following description of certain present preferred embodiments thereof proceeds.

In the accompanying drawings I have shown certain present preferred embodiments of the invention, wherein Figure 1 is a perspective view of a portion of a bimetallic billet;

Figure 2 is cross-section taken on the line II—II of Figure 1;

Figure 3 is a cross-section of a portion of a product formed by compressing and deforming the bimetallic billet shown in Figures 1 and 2;

Figure 4 is a top plan view of a portion of the product shown in cross-section in Figure 3;

Figure 5 is a diagrammatic view, partly in cross-section, showing how the product shown in Figure 3 may be severed to produce a bimetallic article;

Figure 6 is a perspective view of a portion of the bimetallic article shown in cross-section in Figure 5;

Figure 7 is a top plan view of a portion of a bimetallic billet of modified form;

Figure 8 is a cross-section taken on the line VIII—VIII of Figure 7;

Figure 9 is a top plan view of a portion of a product formed by compressing and deforming the bimetallic billet shown in Figures 7 and 8;

Figure 10 is a cross-section taken on the line X—X of Figure 9;

Figure 11 is a diagrammatic view, partly in cross-section, showing how the product shown in Figure 10 may be severed and straightened to produce a bimetallic article; and Figure 12 is an elevational view of a portion of the bimetallic article shown in cross-section in Figure 11.

Referring more particularly to the drawings, and to Figures 1 to 6, inclusive, thereof, reference numeral 2 designates generally a bimetallic billet having a backing member 3 and a facing member 4. The bimetallic billet may be formed in various manners, such, for example, as by separately preforming the backing and facing members and assembling the same as disclosed in the copending application of Frank R. Frost, Serial No. 580,748, filed December 14, 1931, by centrifugally casting one or both of the facing and backing members as disclosed in the copending application of Frank R. Frost, Serial No. 580,747, filed December 14, 1931, or otherwise. The particular billet shown in Figures 1 and 2 is preferably formed by assembling the preformed backing and facing members and interposing between them a sheet 5 of an exceptionally low carbon iron, such, for example, as ingot iron or wrought iron, which will form a barrier to prevent migration of carbon from the backing material to the facing material when the facing material contains a carbon-attractive element, such, for example, as chromium or tungsten. The use of such barrier sheet of exceptionally low carbon material for the prevention of carbon migration is described and claimed in the said copending application Serial No. 580,748. The end of the billet 2 is shown as being welded at 6 to exclude air from between the component members, the upstanding portions 7 of the backing member 3 effectively sealing the billet along the sides.

The bimetallic billet 2 is preferably heated to welding heat and is then thinned and deformed, preferably by rolling, to permanently weld together the backing and facing members and produce an elongated bimetallic member of irregular cross-section, such, for example, as shown in Figures 3 and 4. Such deformation disposes the facing material on more than one side of at least a portion of the backing material so that the member may then be severed to produce a bimetallic article having one metal disposed on more than one side of the other. For example, the member shown in Figure 3 may be sheared along the line 8 to produce two similar articles 9, as shown in Figure 6. Figure 5 shows diagrammatically the effect after shearing, the portion 10 (Figure 3) of the deformed member being removed and either re-formed or re-melted. The elongated bimetallic article shown in Figure 6 is well adapted for many uses, such as the fabrication of automobile bumpers, as it comprises a backing of the base material faced on two adjacent sides with the facing material.

A modified method is illustrated in Figures 7 to 12, inclusive. In Figures 7 and 8 is shown a bimetallic billet 11 comprising a backing 12, a facing 13 and an interposed barrier sheet 14, as above described. Such billet may be welded completely around its periphery, as shown at 15, to exclude air, or other equivalent devices may be used, such, for example, as disloscd in application Serial No. 580,748 above referred to. The billet 11 is thinned and deformed, preferably by rolling, so as to produce an elongated bimetallic member such as shown in Figures 9 and 10. Such member is adapted to be severed along the lines 16 so as to leave the two end portions 17, each of which may then be straightened out to form a bimetallic article 18, as shown in Figures 11 and 12.

The deformation of the bimetallic billet will be suited to the particular shape or shapes desired, and by appropriate deformation and severing almost any shape may be produced. The billet may be originally formed to have an irregular cross-section, if desired, so as to render it suitable for severing without intermediate deformation. Furthermore, after severing, the articles produced may be further deformed or further severed to produce other articles.

While certain present preferred embodiments of the invention have been shown and described, it is to be distinctly understood that the invention is by no means limited to such embodiments, but may be otherwise variously embodied and practiced within the scope of the following claims.

I claim:

1. A method of making a bimetallic article, comprising forming an elongated member having a backing of one metal and a facing of another and having a depression intermediate its edges, whose depth is at least as great as the thickness of the member and severing the same at such depression in a direction generally parallel to the member to form an article comprising a backing having a facing on more than one side.

2. A method of making a bimetallic article, comprising joining together backing and facing metals to form a blank, forming a depression therein intermediate the edges thereof, and severing the same at such depression and in a direction transversely thereof and generally parallel to the blank to form at least one article comprising a backing having a facing on more than one side.

3. A method of making a generally flat bimetallic article having a body of base material with a face and edge portion continuously covered with facing material, comprising providing a generally flat bimetallic member having a body of base material with a face covered with facing material, deforming said member by applying force through said face to bend the facing material about a portion of the base material, and severing said member through the deformed portion and in a direction generally along the member, whereby to form a generally flat bimetallic article having a body of base material with a face and edge portion continuously covered with facing material.

4. A method of making a generally flat bimetallic article having a backing of base material with one face only and an edge portion continuously covered with facing material, comprising providing a generally flat bimetallic member having a backing of base material with one face only covered with facing material, deforming said member by applying force through said face to bend the facing material about a portion of the backing, and severing said member through the deformed portion and in a direction generally along the opposite face thereof, whereby to form a generally flat bimetallic article having a backing of base material with one face only and an edge portion continuously covered with facing material.

5. A method of making a bimetallic article, comprising providing a bimetallic member having a body of base material with a facing of different material thereon, bending the bimetallic member in such manner as to cause the facing material to extend about a portion of the base material, and subsequently severing the bimetallic member through the bent portion and in a direction generally along the member, whereby to form a bimetallic article having a body of base material with a facing of different material disposed continuously on angularly disposed surfaces thereof and about the corner between such surfaces.

DAVID PRYDE.